O. L. BRITTON.
DIRECTION INDICATOR FOR USE IN CONNECTION WITH VEHICLE DIRECTION SIGNALS.
APPLICATION FILED OCT. 2, 1916.

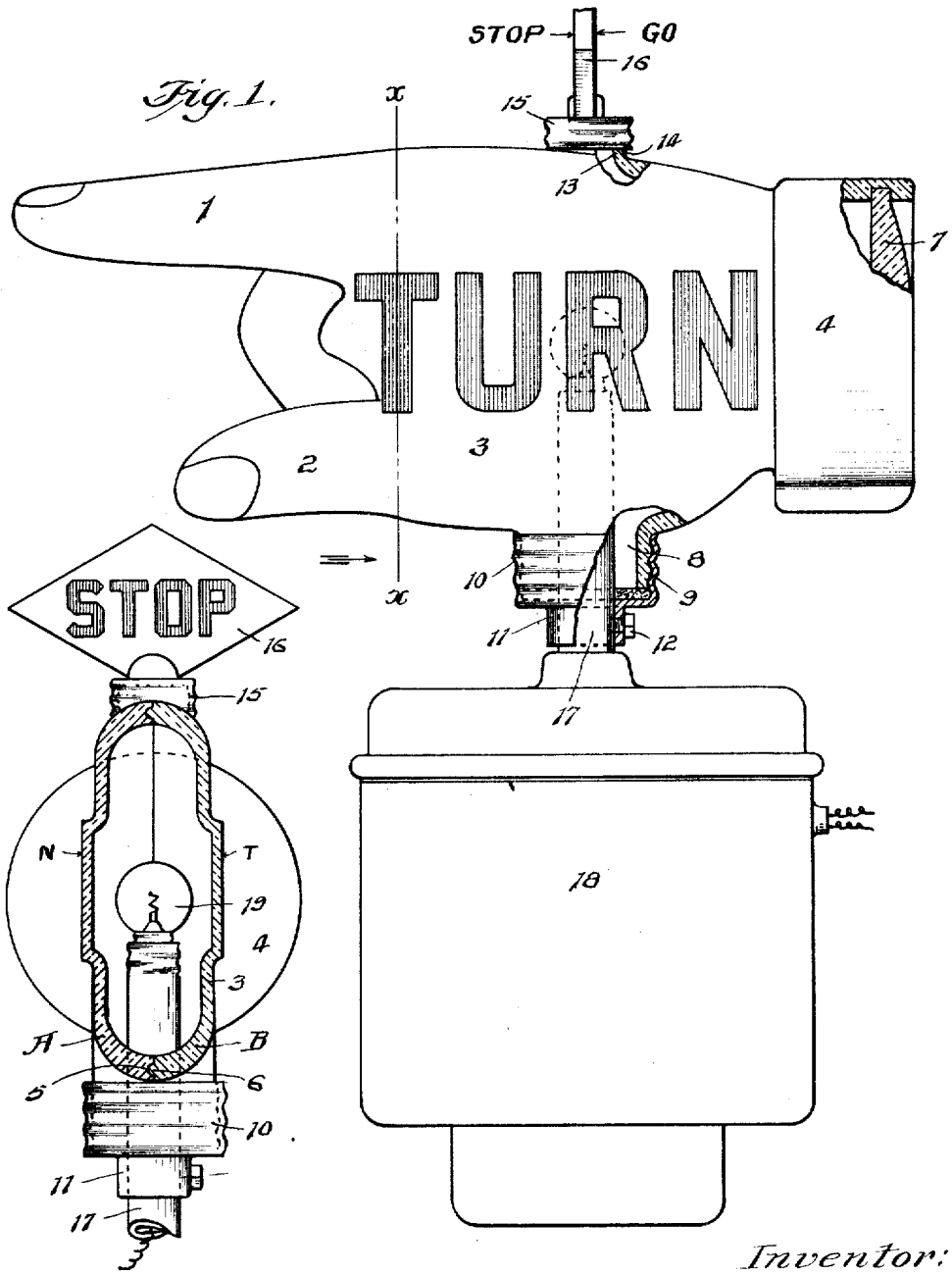

1,306,464.

Patented June 10, 1919.
2 SHEETS—SHEET 2.

Inventor:
Osa Leo Britton,
By
Attorney.

UNITED STATES PATENT OFFICE.

OSA LEO BRITTON, OF DENVER, COLORADO.

DIRECTION-INDICATOR FOR USE IN CONNECTION WITH VEHICLE DIRECTION-SIGNALS.

1,306,464. Specification of Letters Patent. Patented June 10, 1919.

Application filed October 2, 1916. Serial No. 123,263.

*To all whom it may concern:*

Be it known that I, OSA LEO BRITTON, a citizen of the United States, residing in the city and county of Denver, State of Colorado, have invented certain new and useful Improvements in Direction-Indicators for Use in Connection with Vehicle Direction-Signals, of which the following is a specification.

My present invention relates to direction indicators, and more particularly to a pointer or hand adapted to be actuated by suitable means to indicate the anticipated turning movement of a vehicle.

A further object of the invention is to provide a device of this class which may be either hollow or solid, preferably the former, the same to be made from suitable translucent material which will permit the hand, being illuminated from within or without, to clearly display a signal in the form of a hand, with the index finger and thumb extended, adapted to indicate the intended movement of the vehicle to which it is applied.

A still further object of the invention is to provide each side of the hand or indicator with the word "turn" adapted to be preferably pressed or otherwise formed in or upon the glass of which the hand is made, so as to cause the letters to stand out as a raised letter or letters.

Referring to the accompanying drawings forming a part of this specification wherein like characters of reference denote similar parts throughout the several views.

Figure 1 is a side elevation of my improved signal hand as it appears fixed to the armature shaft of an electrical apparatus Fig. 2 is a sectional view taken on line X—X of Fig. 1, looking in the direction of the arrow.

Figure 3:
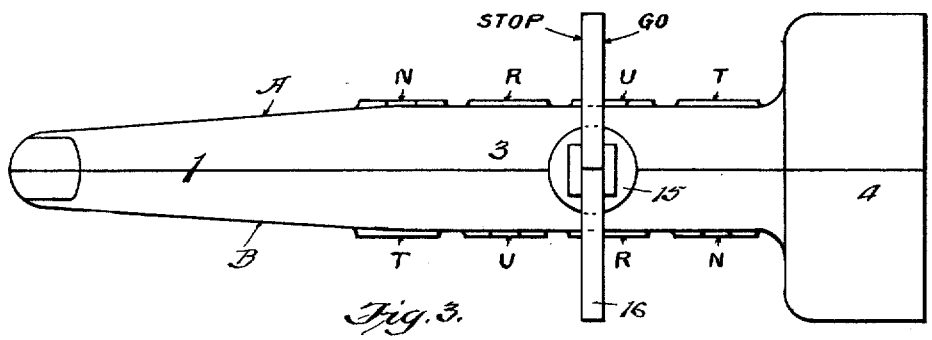
Fig. 3 is a top plan view of the hand shown in Fig. 1.
Figure 4:
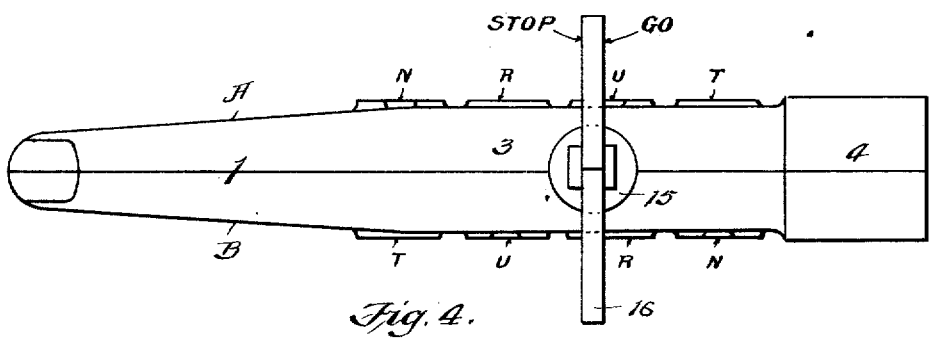
Fig. 4 is a top plan view of a modification of the hand, the cuff portion thereof being reduced.
Figures 5, 6, 7:
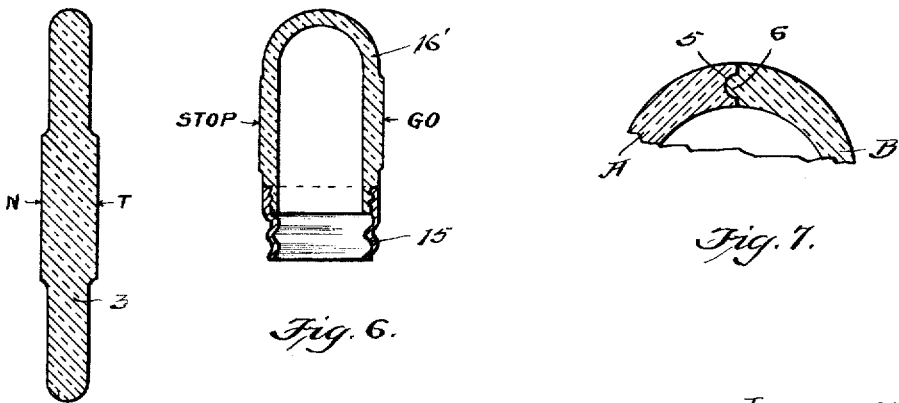
Fig. 5 is a sectional view, similar to Fig. 2, of a solid form of signal hand.
Fig. 6 is a detail of a hollow "Go" and "Stop" attachment.
Fig. 7 is an enlarged detail showing the tongue and groove connection between the two sections forming the hand, as shown in Fig. 2.

In Figs. 1, 2 and 3 of the drawings I have illustrated the preferred form of hand. The hand is shown as hollow so that it may be illuminated from within, as clearly shown in Fig. 2.

The hand is shown on each side as having the index finger 1 and the thumb 2 extended to provide a pointer to indicate directions of travel. The body 3 of the hand terminates at the opposite end in the form of a cuff, or its equivalent 4.

The hand as shown, consists of two sections A and B. Section A is provided around its edge with a groove 5, while the edge of the opposed section B is provided with a tongue 6. Tongue 6 is adapted to register with and enter, the groove 5, as shown. The two sections A and B are adapted to be suitably united, such for instance, as by being cemented together, or otherwise suitably united, thereby forming a unit of the hand sections.

The cuff portion 4 of the hand may be provided with a separate glass end 7, if desired, preferably red in color, to act as a tail lamp. When the tail lamp feature is omitted, the cuff portion of the hand may be united by means of a tongue and groove arrangement as the remainder of the hand.

A tubular neck 8 is formed at the lower end of the hand adjacent the thumb. Half of this neck is formed with each section A and B. The periphery of this neck 8 is preferably provided with screw threads 9 adapted to receive an internally threaded collar 10 having the contracted neck portion 11, which is not threaded. The neck portion 11 is provided with a set screw 12.

The upper crest of the hand may also be provided with a neck designated 13. This neck is also formed of two halves. One-half of the neck is formed with section A, while the other half of the neck is formed with section B. This neck 13 is also provided upon its periphery with the screw threads 14. A screw threaded cap 15 is adapted to be applied to neck 13 and provided with a "Go" and "Stop" signal plate 16. One side of the plate 16 is adapted to be provided with the word "Go," and the other side thereof with the word "Stop."

The hand is illustrated in the drawings as fixed to a revoluble shaft which, in this instance, is the armature shaft 17 of an electric motor 18. It is not my object to be limited to the means of which my hand may be applied, thus I wish it to be clearly understood that I reserve the right to apply my improved signal hand to any device or apparatus which is capable of being actuated to move the signal hand to its various signaling positions. Thus it will be seen that the hand must be attached to some movable part of a signaling apparatus. Any suitable electrical device, such for instance as an electrical motor, solenoid, or similar electrical device or suitable mechanical mechanism or apparatus may be employed for actuating my improved signal hand.

When the hand is of the solid type it may be made from a single plate or two plates, suitably united, to form a unit. Each side of the hand is adapted to be provided with the word "Turn," either pressed or otherwise formed therein, to provide raised letters adapted to be colored red, or the letters may be applied thereto in any other well-known or suitable manner.

Merely painted letters, not raised, may be employed if desired. The letters are preferably translucent and of a different color from the glass forming the hand proper upon which the letters are formed or applied.

The means for illuminating the signal hand at night comprises an electric lamp 19 suitably fixed or applied to the upper end of the shaft 17, to which the hand is fixed and adapted to rotate therewith.

I am aware that slight changes in the form, material and arrangements of the several parts may be made, hence I reserve the right to make any such changes in the form, material and arrangement and formation of the parts as may fairly fall within the spirit of my invention and the scope of the appended claim.

What I claim is:

In combination, with an electrically controlled vehicle signal actuating device having two or more selected positions and a rotatable vertically disposed signal shaft, of a signal comprising two halves formed to provide a hollow hand with the index finger and thumb extended when the halves are united, tongue and groove connection for positively uniting said halves, and visible signal data formed in each half of said hand.

In testimony whereof I have hereunto signed my name to the specification.

OSA LEO BRITTON.

Copies of this patent may be obtained for five cents each, by addressing the "Commissioner of Patents, Washington, D. C."